United States Patent
Clemm et al.

(10) Patent No.: US 8,972,936 B2
(45) Date of Patent: *Mar. 3, 2015

(54) VERSION LABELING IN A VERSION CONTROL SYSTEM

(71) Applicant: International Business Machines Corporation, Armonk, NY (US)

(72) Inventors: Geoffrey M. Clemm, Concord, MA (US); Koinuma Masabumi, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/894,618

(22) Filed: May 15, 2013

(65) Prior Publication Data

US 2013/0326480 A1 Dec. 5, 2013

Related U.S. Application Data

(63) Continuation of application No. 13/484,839, filed on May 31, 2012.

(51) Int. Cl.
*G06F 9/44* (2006.01)

(52) U.S. Cl.
USPC .................................................. 717/122

(58) Field of Classification Search
USPC ................................. 717/113, 122
IPC ............... G06F 8/71,17/00, 9/44536, 17/30309, G06F 17/30575, 17/3056, 17/30607
See application file for complete search history.

(56) References Cited

U.S. PATENT DOCUMENTS

| | | | |
|---|---|---|---|
| 4,853,843 A | | 8/1989 | Ecklund |
| 5,649,200 A | * | 7/1997 | Leblang et al. ............... 717/122 |
| 5,675,802 A | * | 10/1997 | Allen et al. ................... 717/103 |
| 5,701,472 A | * | 12/1997 | Koerber et al. ........................ 1/1 |
| 7,131,112 B1 | | 10/2006 | Batz et al. |
| 7,647,363 B2 | | 1/2010 | Walsh et al. |
| 8,701,084 B1 | * | 4/2014 | MacDonald .................. 717/113 |
| 2004/0103393 A1 | * | 5/2004 | Reddy et al. .................. 717/122 |
| 2007/0143752 A1 | * | 6/2007 | Clemm et al. ................ 717/178 |
| 2007/0162441 A1 | | 7/2007 | Idicula et al. |
| 2013/0326478 A1 | | 12/2013 | Clemm et al. |

OTHER PUBLICATIONS

U.S. Appl. No. 13/484,839, Non-Final Office Action, Jun. 18, 2014, 16 pg.
U.S. Appl. No. 13/484,839, Notice of Allowance, Oct. 7, 2014, 12 pg.

* cited by examiner

*Primary Examiner* — Tuan A Vu

(74) *Attorney, Agent, or Firm* — Cuenot, Forsythe & Kim, LLC (57) ABSTRACT

Version labeling of an artifact in a version control system. An embodiment can include accepting at least one change set into a configuration for the artifact. Based on the change set, a new version of the artifact can be selected by the configuration. Via a processor, an identifier can be generated for the newly selected version of the artifact. The identifier can include at least a branch name for a branch in which the newly selected version of the artifact is contained and a sequence number for the newly selected version of the artifact. The newly selected version of the artifact can be labeled with the generated identifier.

17 Claims, 5 Drawing Sheets

```
┌─────────────────────────────────────────────────────────────────────┐
│ Accept one or more change sets into a configuration that selects a │
│ version of an artifact                                              │
│                                                                 302 │
└─────────────────────────────────────────────────────────────────────┘
                                    │
                                    ▼
┌─────────────────────────────────────────────────────────────────────┐
│ Based on the change set(s), select by the configuration a new      │
│ version of the artifact                                             │
│                                                                 304 │
└─────────────────────────────────────────────────────────────────────┘
                                    │
                                    ▼
┌─────────────────────────────────────────────────────────────────────┐
│ Based on the configuration and the accepted change sets, identify  │
│ versions of the artifact that precede the newly selected version,   │
│ and apply labels to such versions                                   │
│                                                                 306 │
└─────────────────────────────────────────────────────────────────────┘
                                    │
                                    ▼
┌─────────────────────────────────────────────────────────────────────┐
│ Generate an identifier for the newly selected version of the       │
│ artifact, the identifier comprising at least a branch name for a    │
│ branch in which the newly selected version of the artifact is      │
│ contained, a predecessor identifier for the previous version of    │
│ the artifact, and a sequence number for the newly selected         │
│ version of the artifact                                             │
│                                                                 308 │
└─────────────────────────────────────────────────────────────────────┘
                                    │
                                    ▼
┌─────────────────────────────────────────────────────────────────────┐
│ Label the newly selected version of the artifact with the          │
│ generated identifier                                                │
│                                                                 310 │
└─────────────────────────────────────────────────────────────────────┘
```

VERSION LABELING IN A VERSION CONTROL SYSTEM

CROSS-REFERENCE TO RELATED APPLICATIONS

This application is a continuation of U.S. application Ser. No. 13/484,839, titled VERSION LABELING IN A VERSION CONTROL SYSTEM, and filed May 31, 2012, the entirety of which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Arrangements described herein relate to version labeling in a version control system.

In version control systems, a version identifier is a string that is assigned to a version of a given artifact (e.g., a file or directory) under version control. Two versions of different artifacts can have the same version identifier, but two different versions of the same artifact cannot have the same version identifier.

In addition to providing a means to uniquely identify a specific version of a given artifact, version identifier schemes often are designed to simplify human-to-human communication about versions. One requirement may be, for example, that the version identifiers be easy for a human to remember and communicate. Commonly, this is accomplished by structuring the version identifier to include a number (e.g., "127"), a series of numbers (e.g., "1.3.5.2"), or a meaningful word combined with a number (e.g., "main/23").

BRIEF SUMMARY

One or more embodiments disclosed within this specification relate to version labeling of an artifact in a version control system. An embodiment can include accepting at least one change set into a configuration for the artifact. Based on the change set, a new version of the artifact can be selected by the configuration. Via a processor, an identifier can be generated for the newly selected version of the artifact. The identifier can include at least a branch name for a branch in which the newly selected version of the artifact is contained, a predecessor identifier for the previous version of the artifact, and a sequence number for the newly selected version of the artifact. The newly selected version of the artifact can be labeled with the generated identifier.

Another embodiment can include accepting at least one change set into a configuration that selects a version of an artifact. Based on the change set, a new version of the artifact can be selected by the configuration. Via a processor, in a first branch of a version tree, a first identifier for the newly selected version of the artifact can be generated. The first identifier can include at least a first branch name for a branch in which the newly selected version of the artifact is contained and a first sequence number for the newly selected version of the artifact. The newly selected version of the artifact with can be labeled with the first identifier. A user input can be received to select to initiate a second branch of the version tree at the newly selected version of the artifact. Responsive to receiving the user input, a second identifier can be generated for the newly selected version of the artifact. The second identifier can include at least a second branch name for the second branch and a second sequence number for the newly selected version of the artifact. The newly selected version of the artifact can be labeled with the second identifier.

Another embodiment can include a system having a processor. The processor can be configured to initiate executable operations including the methods and processes described herein.

Another embodiment can include a computer program product for version labeling of an artifact in a version control system. The computer program product can include a computer-readable storage medium having stored thereon program code that, when executed, configures a processor to perform executable operations including the methods and processes described herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Arrangements described herein relate to version labeling in a version control system, for example a change set based version control system. Specifically, at least one change set can be accepted into a configuration that selects a version of an artifact. Based on the change set(s), a new version of the artifact can be selected by the configuration. An identifier can be created for the newly selected version of the artifact. The identifier can comprise a branch name, an optional predecessor identifier that identifies the root of the sub-branch to which this version belongs, and a sequence number for the newly selected version of the artifact.

Several definitions that apply throughout this document will now be presented. As used herein, the term "artifact" means an entity that is used or produced by a software development process. Examples of artifacts include, but are not limited to, models, source files, scripts, and binary executable files.

As used herein, the term "change set" means a group of related changes to artifacts in a flow target (e.g., a workspace or stream). In this regard, a change set can be implemented as a repository object that collects a related group of artifact modifications so that the modifications can be applied to a flow target in a single operation. In illustration, a change set can identify a before state and an after state of one or more artifacts associated with an artifact. The before state is a state of an artifact before a particular change is made to the artifact, and the after state is a state of the artifact after the particular change is made to the artifact.

As used herein, the term "configuration" means a set of versions, with at most one version selected for a given artifact. A configuration includes one or more change sets, in particular, the change sets that have been accepted into the configuration.

As used herein, the term "user" means a human being (i.e., a person). A user can be a computer programmer, though this need not be the case.

Figure 1:
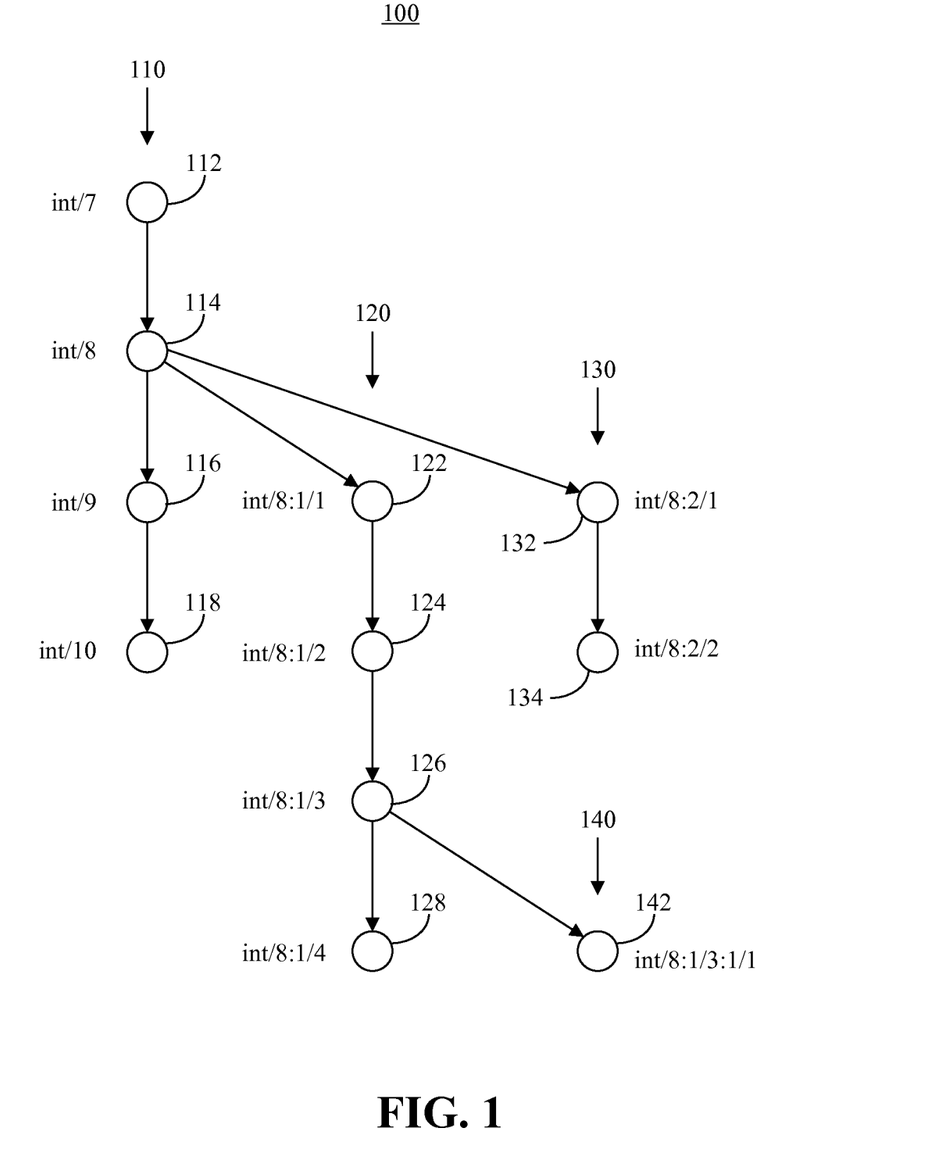
FIG. 1 is a version tree in which artifact versions are labeled in accordance with one embodiment disclosed within this specification.

FIG. 1 is a version tree 100 in which artifact versions are labeled in accordance with one embodiment disclosed within this specification. The respective versions are represented by circles in the version tree 100. A version 112 can be labeled with an identifier "int/7", which can indicate that the version 112 is a seventh version in a first "int" branch 110 and based on a prior sixth version (not shown) since the number 7 follows the number 6 in a numerical sequence. Similarly, a version 114 can be labeled with an identifier "int/8", which can indicate that the version 114 is an eighth version in the branch 110 and based on the prior seventh version, a version 116 can be labeled with an identifier "int/9", which can indicate that the version 116 is a ninth version in the branch 110 and based on the prior eighth version, and a version 118 can be labeled with an identifier "int/10", which can indicate that the version 118 is a tenth version in the branch 110 and based on the prior ninth version. The version labels can be automatically generated and assigned to respective versions of the artifact using one or more processors, for example using a computer.

Each successive version can be based on the version that immediately precedes it in the branch 110. For example, the version 116 can be generated (or created) from the version 114, and include one or more modifications to the version 114. For each version of the artifact, the modifications can be identified in one or more change sets accepted into a configuration. In this regard, each newly selected version that is selected by a configuration can be based on change set(s) accepted into that configuration.

Multiple subsequent versions can be based on any of the versions 112-118. For example, in addition to the version 116, a version 122 and a version 132 can be based on the version 114. For example, each of the versions 116, 122, 132 can be generated from the version 114, and include respective modifications to the version 114. In this example, the versions 122, 132 can represent the beginning of newly selected version sub-branches 120, 130, respectively.

Because the versions 122, 132 are not part of the main sequence numbering for the branch 110, it may be difficult for a user (e.g., a computer programmer) to immediately identify which version of the artifact the versions 122, 132 are based on. In accordance with the present arrangements, a method of version labeling is provided to facilitate such identification.

By way of example, the Backus Naur Form (BNF) syntax for labeling a version of the artifact with a version identifier can be implemented as follows:

```
<version-id> = <branch-name> <predecessor-id>*
    <sequence-number>;
where:
    <branch-name> = STRING;
    <predecessor-id> = <sequence-number> <branch-number>;
    <sequence-number> = '/' INTEGER;
    <branch-number> = ':' INTEGER;
```

Note that in the foregoing syntax, logical elements of the syntax are enclosed in angle brackets (< and >), explicit character strings are enclosed in quote marks (' and '), an arbitrary number of the preceding syntax element is indicated by an asterisk (*), and the end of a syntax rule is indicated by a semi-colon (;).

The branch name can be a string value identifying a branch to which the labeled version of the artifact belongs (note that the same before can belong to multiple branches). The predecessor identifier can identify a previous version upon which the current version is based. The sequence number can be an integer following a '/' character or symbol, and the branch number can be an integer following a ':' character or symbol. Again, the version labels can be automatically generated and assigned to respective versions of the artifact using one or more processors.

In illustration, modifications to the artifact can be accepted using change sets applied the successive versions 112-118. A user, however, may desire to roll back the changes to go back to version 114, and create a new change set that generates a newly selected version 122 based on the version 114. Since version 114 already has version 116 as its successor on the branch, a new sub-branch of the branch must be created for version 122, and the new sub-branch 120 can be created beginning with the version 122. Since the version 122 is based on the version 114, but contained in a different sub-branch than the version 114, the version 122 can be labeled "int/8:1/1". The inclusion of branch name "int" in the label can indicate that this is a sub-branch of the "int" branch. The inclusion of sequence number "/8" in the label can indicate that the version 122 is based on the version 114 labeled "int/8". The inclusion of branch number ":1" in the label can indicate that version 122 is contained in a first sub-branch from the version 114, and the inclusion of the sequence number "/1" can indicate that the version 122 is the first version in the sub-branch 120.

Similarly, the user may desire to select yet another version 132 based on the version 114 using a respective change set that generates version 132 based on the version 114. Since the version 132 represents a second sub-branch from version 114, the version 132 can be labeled "int/8:2/1", wherein the inclusion of branch number ":2" in the label indicates that the version 132 is contained in a second sub-branch 130. A version 134 can be based on the version 132 and generated using a respective change set that identifies the version 132, and thus can be labeled "int/8:2/2", where the inclusion of sequence identifier "/2" in the label indicates that the version 134 is based on the version 132 labeled "int/8:2/1" since the number 2 follows the number 1 in a numerical sequence.

The version 124 can be labeled "int/8:1/2", indicating that the version 124 is based on the version 122 labeled "int/8:1/1". A successive version can be generated based on the version 124 using a respective change set, and the modifications can be accepted, and further successive versions can be recursively generated. The version 126 can be labeled "int/8:1/3", indicating that the version 126 is based on the second version.

The version 128 can be based on the version 126, and thus labeled "int/8:1/4". Again, a user may roll back the changes to go back to the version 126, and generate a newly selected version 142 based on the version 126, and thus begin another new sub-branch 140. In this case, the version 142 can be labeled "int/8:1/3:1/1".

By assigning labels to the versions as described herein, a user can read a label assigned to a particular version of an artifact, and readily identify which other versions the particular version is based on, even when those other versions are not presented to the user in another manner that associates the various versions. In this regard, the version tree 100 is presented merely to depict the relationships between various versions of an artifact. The version tree 100 can be presented to a user, but this need not be the case. Indeed, one or more versions 112-118, 122-128, 132-134, 142 of an artifact can be presented to a user independent of the version tree 100.

TABLE 1 presents source code that can be implemented to perform one or more functions associated with the foregoing arrangement for labeling artifact versions. When a new branch is added to a configuration, the "labelConfiguration" function presented in TABLE 1 can be applied to the configuration. When a list of change sets are accepted into the configuration, the "labelChangeSets" function presented in TABLE 1 can be applied to the list of change sets.

TABLE 1

```
class VersionId {
    String branchName;
    String prefix;
    Integer sequenceNumber;
}
// Label all versions in the specified configuration
void labelConfiguration(
        Configuration configuration)
{
    String branchName = getBranchName(configuration);
    if (branchName == null) {
        // This configuration is not being labeled
        return;
    };
    for (Version version : configuration.getVersionList( )) {
        labelVersion(version, branchName);
    };
};
```

TABLE 1-continued

```
// Label all versions in the specified list of change sets
void labelChangeSets(
      Configuration configuration,
      List<ChangeSet> changeSetList)
{
   String branchName = getBranchName(configuration);
   if (branchName == null) {
      // This configuration is not being labeled
      return;
   };
   for (ChangeSet changeSet : changeSetList) {
      for (Version version : changeSet.getLatestVersionList( )) {
         labelVersion(version, branchName);
      };
   };
};
void labelVersion (
      Version version,
      String branchName)
{
   if (getVersionId(version, branchName) != null) {
      // Version is already labeled for this branch
      return;
   };
   List<Version> predecessorList = version.getPredecessorList( );
   if (predecessorList.size( ) == 0) {
      addVersionId(version, createVersionId(branchName, "", 1));
      return;
   };
   Version predecessor = predecessorList.get(0);
   labelVersion(predecessor, branchName);
   VersionId predVersionId
      = getVersionId(predecessor, branchName);
   String prefix = predVersionId.prefix;
   Integer predSequenceNumber = predVersionId.sequenceNumber;
   Integer branchCount = predecessor.getSuccessorList( ).size( );
   if (branchCount > 0) {
      prefix = prefix + "/" + predSequenceNumber
             + ":" + branchCount;
      predSequenceNumber = 0;
   }
   addVersionId(
      version,
      createVersionId(branchName, prefix, predSequenceNumber+1));
};
private void addVersionId(
      Version version,
      VersionId versionId)
{
   List<VersionId> versionIds = getVersionIds(version);
   versionIds. add(versionId);
   setVersionIds(version, versionIds);
}
private VersionId getVersionId(
      Version version,
      String branchName)
{
   for (VersionId versionId : getVersionIds(version)) {
      if (versionId.branchName.equals(branchName)) {
         return versionId;
      }
   }
   return null;
}
private VersionId createVersionId(
      String branchName,
      String prefix,
      Integer sequenceNumber)
{
   VersionId vid = newly selected versionId( );
   vid.branchName = branchName;
   vid.prefix = prefix;
   vid.sequenceNumber = sequenceNumber;
   return vid;
}
```

Figure 2:
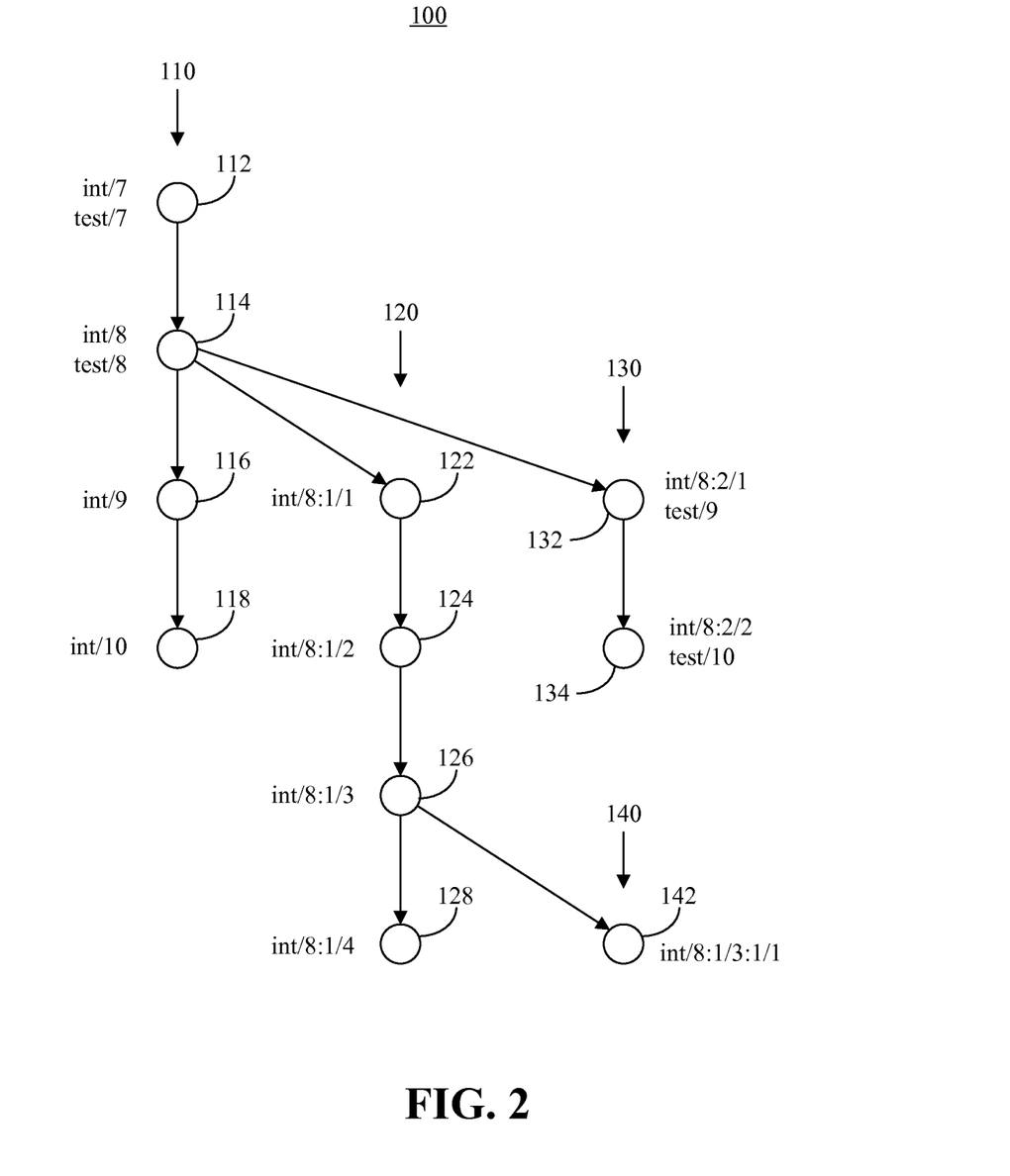
FIG. 2 is a version tree in which artifact versions are labeled in accordance with another embodiment disclosed within this specification.

FIG. 2 depicts another arrangement of the version tree 100 of FIG. 1. In this arrangement, a user may choose to initiate a new branch by creating a new configuration, giving the new configuration a new branch name, for example "test", and accepting all change sets up to the selected version 114. In response to receiving such user input, additional labels can be generated for versions in that configuration. Each additional label can comprise the new branch name (e.g., "test") and a respective sequence number corresponding to the position of the respective version in the new branch. Again, the sequence number can follow the branch name and be preceded by the "/" character or symbol.

In illustration, the label "test/8" can be assigned to the version 114 in addition to the label "int/8". The sequence number "8" can indicate that the version 114 is an eighth version in the version branch 110. The versions 132, 134 also can be included in the test branch. Because the version 114 does not have another descendant on the test branch, there need not be a sub-branch in the test branch. Thus, the version 132 can be labeled "test/9" in addition to the label "int/8:2/1" and the version 134 can be labeled "test/10" in addition to the label "int/8:2/2".

Accordingly, a user viewing the labels assigned to the version 134, for example, will immediately know that the version 134 corresponds to the tenth version of the artifact in the "test" branch and the second version of the artifact in the 8:2 sub-branch of the "int" branch.

Figure 3:
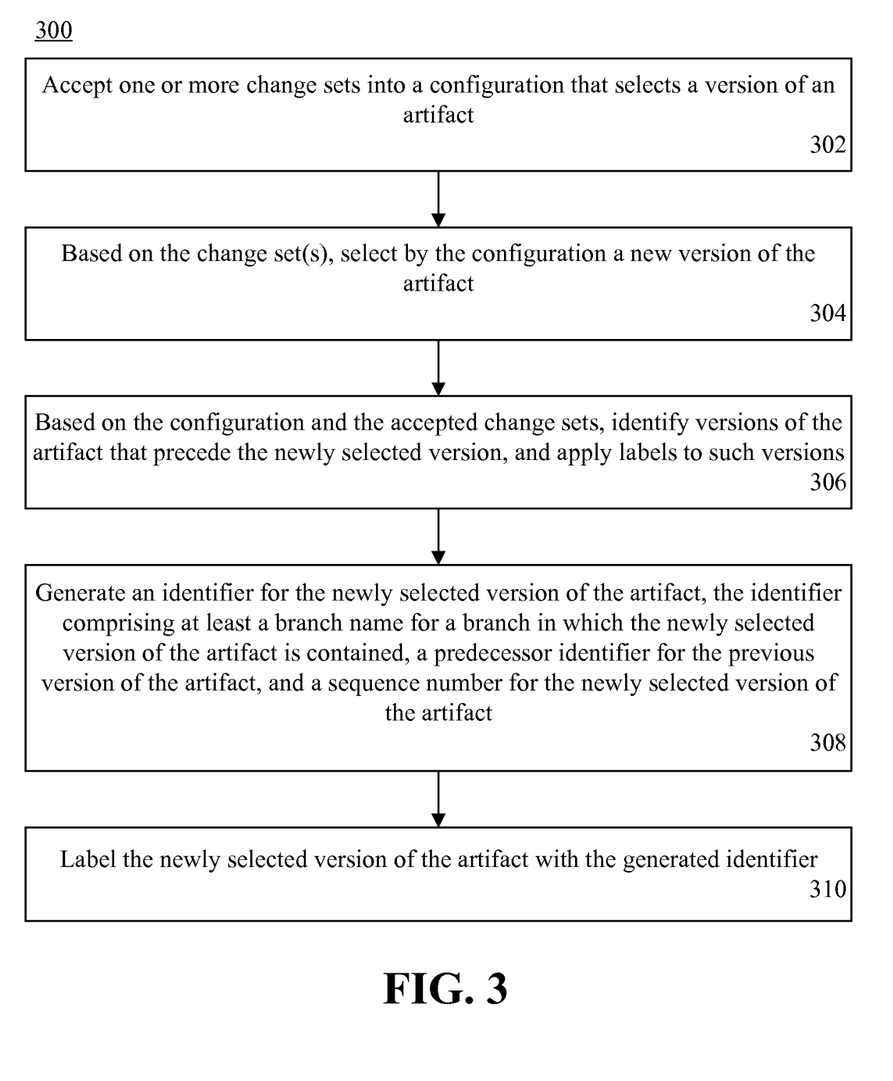
FIG. 3 is a flow chart illustrating a method of version labeling of an artifact in a version control system in accordance with another embodiment disclosed within this specification.

FIG. 3 is a flow chart illustrating a method 300 of version labeling of an artifact in a version control system in accordance with another embodiment disclosed within this specification. At step 302, one or more change sets can be accepted into a configuration that selects a version of an artifact. For example, a user can associate the change sets with the configuration and accept the change sets.

At step 304, based on the change sets, a newly selected version of the artifact can be selected by the configuration. At step 306, based on the configuration and the accepted change sets, versions of the artifact that precede the newly selected version can be identified, and labels can be applied to such versions. At step 308, an identifier for the newly selected version of the artifact can be generated. The identifier can comprise at least a branch name for a branch in which the newly selected version of the artifact is contained, a predecessor identifier for the previous version of the artifact, and a sequence number for the newly selected version of the artifact. At step 310, the newly selected version of the artifact can be labeled with the generated identifier.

It should be noted that one or more of the labels applied to the previous versions of the artifact at step 306 may be applied to such versions in accordance with the process described in steps 308 and 310, though the present arrangements are not limited in this regard.

Figure 4:
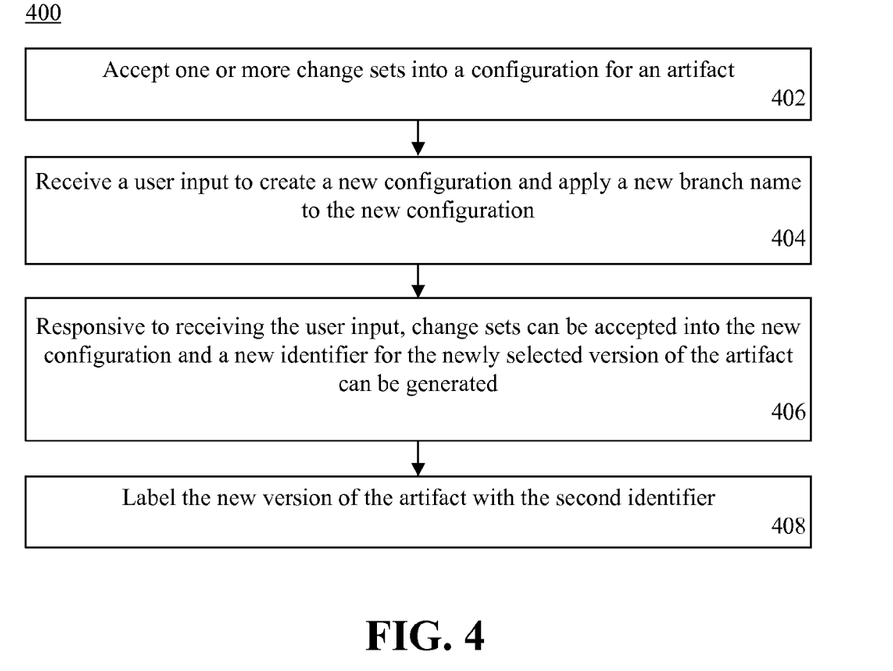
FIG. 4 is a flow chart illustrating a method of version labeling of an artifact in a version control system in accordance with another embodiment disclosed within this specification.

FIG. 4 is a flow chart illustrating a method 400 of version labeling of an artifact in a version control system in accordance with another embodiment disclosed within this specification. At step 402, one or more change sets can be accepted into a configuration for an artifact. For example, a user can associate the change sets with the configuration and accept the change sets.

At step 404, a user input can be received to create a new configuration and apply a new branch name to the new configuration. At step 406, responsive to receiving the user input, change sets can be accepted into the new configuration and a new identifier for the newly selected version of the artifact can be generated. The second identifier can comprise at least a second branch name for the second branch and a second sequence number for the newly selected version of the artifact. At step 408, the newly selected version of the artifact can be labeled with the second identifier.

Accordingly, a particular version of an artifact can be contained in at least two branches of a version tree, and a unique label can be applied to the version for each of the branches in which the version of the artifact is contained. Moreover, the plurality of labels can facilitate user comprehension of the relationships between various branches of the version tree.

Figure 5:
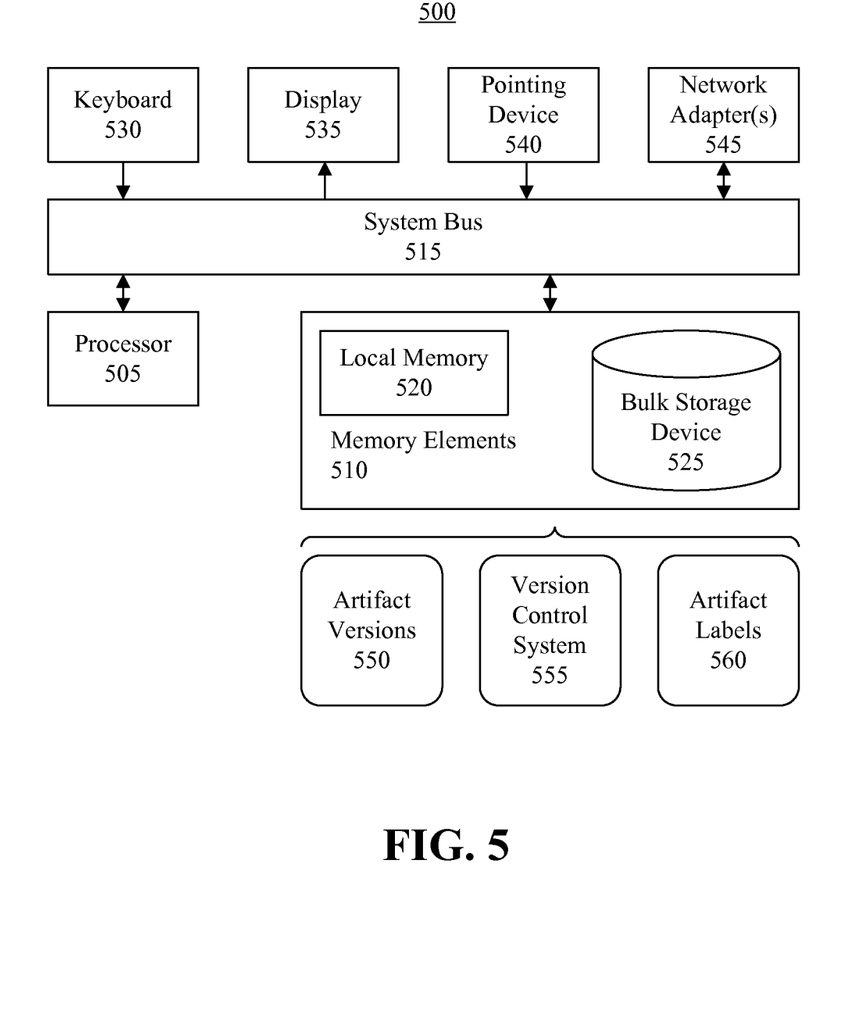
FIG. 5 is a block diagram illustrating a processing system for version labeling in a version control system in accordance with another embodiment disclosed within this specification.

FIG. 5 is a block diagram illustrating a processing system 500 for version labeling in a version control system 555 in accordance with an embodiment disclosed within this specification. The system 500 can include at least one processor 505 coupled to memory elements 510 through a system bus 515 or other suitable circuitry. As such, the system 500 can store program code within the memory elements 510. The processor 505 can execute the program code accessed from the memory elements 510 via the system bus 515. In one aspect, for example, the system 500 can be implemented as a computer that is suitable for storing and/or executing program code. It should be appreciated, however, that the system 500 can be implemented in the form of any system including a processor and memory that is capable of performing the functions and/or operations described within this specification.

Memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device(s). The system 500 also can include one or more cache memories (not shown) that provide temporary storage of at least some program code in order to reduce the number of times program code must be retrieved from bulk storage device 525 during execution.

Input/output (I/O) devices such as a keyboard 530, a display 535, and a pointing device 540 optionally can be coupled to system 500. The I/O devices can be coupled to the system 500 either directly or through intervening I/O controllers. One or more network adapters 545 also can be coupled to the system 500 to enable the system 500 to become coupled to other systems, computer systems, remote printers, and/or remote storage devices through intervening private or public networks. Modems, cable modems, and Ethernet cards are examples of different types of network adapters 545 that can be used with system 500.

As pictured in FIG. 5, the memory elements 510 can store artifact versions 550, a version control system 555, and artifact labels 560 generated by the version control system 555 for the artifact versions 550. The version control system 555, being implemented in the form of executable program code, can be executed by the system 500 and, as such, can be considered part of system 500. When executed, the version control system 555 can perform the methods and functions described herein. For example, the version control system 555 can accept change sets into configurations for artifacts, select new versions of the artifacts, and label the artifacts. One or more of such methods/functions can be at the behest of a user.

The labeled artifacts can be output to, and stored within, the memory elements 510. As used herein, "outputting" and/or "output" can mean storing in the memory elements 510, for example, writing to a file stored in the memory elements 510, writing to the display 535 or other peripheral output device, playing audible notifications, sending or transmitting to another system, exporting, or the like.

Like numbers have been used to refer to the same items throughout this specification. In one embodiment, the version control system 555 can be implemented as IBM® Rational® Team Concert™ (IBM and Rational and Team Concert are trademarks of International Business Machines Corporation in the United States, other countries, or both).

The flowcharts and block diagram in the Figures illustrate the architecture, functionality, and operation of possible implementations of systems, methods and computer program products according to various embodiments of the present invention. In this regard, each block in the flowcharts or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustrations, and combinations of blocks in the block diagram and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

Reference throughout this specification to "one arrangement", "one embodiment", "and arrangement", "an embodiment", or similar language means that a particular feature, structure, or characteristic described in connection with the embodiment is included in at least one embodiment disclosed within this specification. Thus, appearances of the phrases "in one embodiment", "in an embodiment", "in one arrangement", "in an arrangement" and similar language throughout this specification may, but do not necessarily, all refer to the same embodiment.

The term "plurality", as used herein, is defined as two or more than two. The term "another", as used herein, is defined as at least a second or more. The term "coupled", as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]", depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
    a processor configured to initiate executable operations comprising:
    collecting, in a change set, a group of related changes to at least one artifact in a flow target, wherein the change set is a repository object, stored in a data repository, identifying a before state and an after state of the at least one artifact in the flow target;
    responsive to collecting in the change set the group of related changes to the at least one artifact in the flow target, accepting the change set into a configuration
    responsive to accepting the change set, selecting by a version control system executed by the processor, from memory elements, a new version of the artifact the new version of the artifact including the group of related changes to the at least one artifact in the flow target;
    via the version control system, generating an identifier for the newly selected version of the artifact, the identifier comprising at least a branch name for a branch in which the newly selected version of the artifact is contained, a predecessor identifier for the previous version of the artifact, and a sequence number for the newly selected version of the artifact, wherein the branch name, the predecessor identifier and the sequence number are appended together in the identifier; and
    labeling the newly selected version of the artifact with the generated identifier, the generated identifier configured to be automatically displayed proximate to a version tree node representing the newly selected version of the artifact when the version tree node is presented in a version tree on a display.

2. The system of claim 1, wherein the processor further is configured to initiate executable operations comprising:
    generating the predecessor identifier, the predecessor identifier comprising at least a sequence number and a branch number corresponding to the previous version of the artifact.

3. The system of claim 2, wherein the predecessor identifier further comprises a branch name for a branch in which the previous version of the artifact is contained.

4. The system of claim 3, wherein the branch name for the branch in which the previous version of the artifact is contained is different than the branch name for the branch in which the newly selected version of the artifact is contained.

5. The system of claim 3, wherein the processor further is configured to initiate executable operations comprising:
    labeling the previous version of the artifact with the predecessor identifier.

6. The system of claim 1, wherein:
    the newly selected version of the artifact is generated from a plurality of previous versions of the artifact, wherein the plurality of previous versions of the artifact are contained in different version branches; and
    the identifier for the newly selected version of the artifact includes a plurality of predecessor identifiers, each of which identifies a respective one of the plurality of previous versions.

7. The system of claim 1, wherein the identifier further comprises a branch number for a sub-branch, in which the newly selected version of the artifact is contained, of the branch.

8. A system comprising:
    a processor configured to initiate executable operations comprising:
    collecting, in a change set, a group of related changes to at least one artifact in a flow target, wherein the change set is a repository object, stored in a data repository, identifying a before state and an after state of the at least one artifact in the flow target;
    responsive to collecting in the change set the group of related changes to the at least one artifact in the flow target, accepting the change set into a configuration;
    responsive to accepting the change set, selecting by a version control system executed by the processor, from memory elements, a new version of the artifact the new version of the artifact including the group of related changes to the at least one artifact in the flow target;
    via the version control system, in a first branch of the version tree, generating a first identifier for the newly selected version of the artifact, the first identifier comprising at least a first branch name for a first branch in which the newly selected version of the artifact is contained and a first sequence number for the newly selected version of the artifact, wherein the first branch name and the first sequence number are appended together in the first identifier;
    labeling the newly selected version of the artifact with the first identifier the first identifier configured to be automatically displayed proximate to a version tree node representing the newly selected version of the artifact when the version tree node is presented in a version tree;
    receiving a user input selecting to initiate a second branch of the version tree at the newly selected version of the artifact;
    responsive to receiving the user input, generating a second identifier for the newly selected version of the artifact, the second identifier comprising at least a second branch name for the second branch and a second sequence number for the newly selected version of the artifact, wherein the second branch name and the second sequence number are appended together in the second identifier; and
    labeling the newly selected version of the artifact with the second identifier, the second identifier configured to be automatically displayed proximate to the version tree node representing the newly selected version of the artifact when the version tree node is presented in the version tree on a display.

9. The system of claim 8, wherein the processor further is configured to initiate executable operations comprising:
    for each additional version of the artifact subsequent to the newly selected version of the artifact, generating a respective first identifier comprising the first branch name and a respective sequence number corresponding to a position of the additional version of the artifact in the first branch, and generating a respective second identifier comprising the second branch name and a respective sequence number corresponding to a position of the additional version of the artifact in the second branch.

10. The system of claim 8, wherein the first identifier further comprises a first branch number for a sub-branch, in which the newly selected version of the artifact is contained, of the first branch.

11. A computer program product for version labeling of an artifact in a version control system, said computer program product comprising:
a computer-readable storage device, wherein the computer-readable storage device is not a transitory, propagating signal per se, having stored thereon program code that, when executed, configures a processor to perform executable operations comprising:
collecting, in a change set, a group of related changes to at least one artifact in a flow target, wherein the change set is a repository object, stored in a data repository, identifying a before state and an after state of the at least one artifact in the flow target;
responsive to collecting in the change set the group of related changes to the at least one artifact in the flow target, accepting the change set into a configuration
responsive to accepting the change set, selecting by a version control system executed by the processor, from memory elements, a new version of the artifact the new version of the artifact including the group of related changes to the at least one artifact in the flow target;
via the version control system, generating an identifier for the newly selected version of the artifact, the identifier comprising at least a branch name for a branch in which the newly selected version of the artifact is contained, a predecessor identifier for the previous version of the artifact, and a sequence number for the newly selected version of the artifact, wherein the branch name, the predecessor identifier and the sequence number are appended together in the identifier; and
labeling the newly selected version of the artifact with the generated identifier, the generated identifier configured to be automatically displayed proximate to a version tree node representing the newly selected version of the artifact when the version tree node is presented in a version tree on a display.

12. The computer program product of claim 11, wherein the processor further is configured to perform executable operations comprising:
generating the predecessor identifier, the predecessor identifier comprising at least a sequence number and a branch number corresponding to the previous version of the artifact.

13. The computer program product of claim 12, wherein the predecessor identifier further comprises a branch name for a branch in which the previous version of the artifact is contained.

14. The computer program product of claim 13, wherein the branch name for the branch in which the previous version of the artifact is contained is different than the branch name for the branch in which the newly selected version of the artifact is contained.

15. The computer program product of claim 13, wherein the processor further is configured to perform executable operations comprising:
labeling the previous version of the artifact with the predecessor identifier.

16. The computer program product of claim 11, wherein:
the newly selected version of the artifact is generated from a plurality of previous versions of the artifact, wherein the plurality of previous versions of the artifact are contained in different version branches; and
the identifier for the newly selected version of the artifact includes a plurality of predecessor identifiers, each of which identifies a respective one of the plurality of previous versions.

17. The computer program product of claim 11, wherein the identifier further comprises a branch number for a sub-branch, in which the newly selected version of the artifact is contained, of the branch.

* * * * *